US000001266H

United States Statutory Invention Registration [19]

[11] Reg. Number: H1266

[43] Published: Dec. 7, 1993

Zacharin

[54] TIME COUPLING

[75] Inventor: Alexey T. Zacharin, Denville, N.J.

[73] Assignee: The United States of America as represented by the Secretary of the Army, Washington, D.C.

[21] Appl. No.: 892,065

[22] Filed: May 29, 1992

[51] Int. Cl.[5] ..... F42C 15/184; F42C 15/21

[52] U.S. Cl. ..... 102/255; 102/256; 102/260

*Primary Examiner*—Stephen M. Johnson

*Attorney, Agent, or Firm*—Anthony T. Lane; Edward Goldberg; Michael Sachs

[57] ABSTRACT

A coupling device for use with a primer and blasting cap in demolition firing devices and the like. The device includes a body portion defining a straight line path from the primer to the blasting cap. Also included is a moveable slide positioned in the body to block the straight line path and moveable to clear that path. A spring is used to act on the slide to clear the path, and a safety pin holds the slide against the spring until firing is desired. A time delay device such as a liquid annular orifice dashpot delays movement of the slide. A preferred embodiment uses two slides and two springs to first clear the path and second place a blasting cap lead in alignment on the path when the slides clear the path.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TIME COUPLING

The invention described herein may be made, used, or licensed by or for the Government for Governmental purposes without the payment to me of any royalties thereon or therefor.

FIELD OF THE INVENTION

The present invention relates to a timing coupling, and more particularly to a coupling device for use with a primer and blasting cap for demolition firing devices.

BACKGROUND OF THE INVENTION

Current demolition devices all are equipped with a primer and a blasting cap which are separated by some device to prevent premature firing. Of these devices, most common are the M1A1, which has a pressure type demolition firing device, the M3 and M5, which have pull/release firing mechanisms and pressure/release type demolition firing device respectively, and the M142 which has a standard firing device. However, none of these devices have arming safety features and all are in-line and ready to fire upon pulling of a single pull pin which has been installed for safety.

All of these devices are attached to base coupling with a primer and an attachment for engagement with a blasting cap. This is a conventional armature arrangement. When these devices are utilized in the field, they are extremely hazardous, especially in dark or night conditions, because none of these devices have an arming time to allow safe separation by personnel operating and arming them. There sometimes is just not enough time to get away, particularly if terrain is difficult or under surveillance.

None of these current demolition devices have an arming device safety which can protect the user from accidentally functioning and potential harm to the user. This is particularly of concern when the personnel are installing or trying to withdraw from boobytrapped areas. As soon as the safety pin is withdrawn, and all of these devices are so protected initially, the device is fully armed and ready to fire. The personnel installing the device are still in the area and are thus at risk.

This may be an unreasonable safety risk, and therefore it is an object of this invention to obviate that safety risk. This is also an unnecessary risk when the device of the present invention is employed.

All of the current demolition devices have a common explosive train interface which fits in a base coupling, in the form of a separate element which is screwed into or otherwise attached to the demolition devices listed above. The base coupling has a primer at one end and a firing for a blasting cap, such as the M7 blasting cap, on the other end.

It is therefore an object of the present invention to provide a safety device for use with these conventional designs.

Another object of this invention is to provide a device which replaces the standard base coupling with a time coupling to present a barrier between output of the percussion primer and the blasting cap.

Still another object of the present invention is to provide a timing coupling for current demolition devices which offers substantial safety to the use.

Other Objects will appear hereinafter.

SUMMARY OF THE INVENTION

It has now been discovered that the above and other objects of the present invention may be accomplished in the following manner. Specifically, a coupling device for use with a primer and blasting cap has been discovered which includes a body portion defining a straight line path from the primer to the blasting cap.

The device includes a moveable slide means positioned in the body to block the path from the primer to the cap, with the slide means being moveable to clear the path. There is a biasing means, usually in the form of a spring, urging the slide means to clear the path and a safety locking means holding the slide against the biasing means. The safety locking means is a safety pin and is removeable upon demand.

Also provided is a time delay means for delaying movement of the slide means by the biasing means to clear the path after removal of the safety locking means. In a preferred embodiment, the time delay means is a liquid annular orifice dashpot with a time delay of at least 2 minutes. Most preferred is a liquid annular orifice dashpot with a time delay between 2 and 6 minutes.

In a preferred embodiment, the slide means includes a first slide positioned in the path and having a blasting cap lead aligned to be in the path when the first slide clears the path. This first slide has a second biasing means or spring urging the first slide to clear the path. The slide means also including a second slide positioned in a first or safe position by the safety lock means in which it is spaced from the time delay means with the biasing means urging this second slide toward the time delay means. The preferred slide means also including detent means preventing movement of the first slide until movement of the second slide is permitted by the time delay means.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
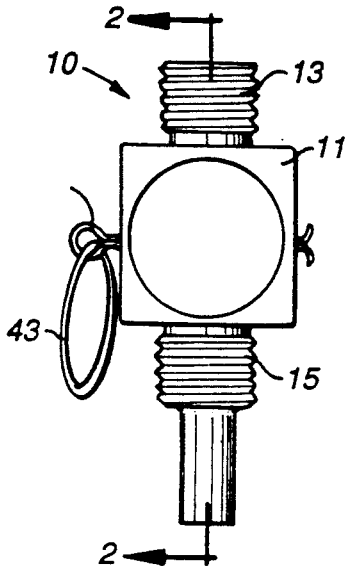
FIG. 1 is a slide elevational view showing the device of this invention.

As shown in the Figures, a device shown generally by reference numeral 10 includes a body or housing 11 with fittings 13 and 15 for installation to replace conventional base coupling devices. A safety pin 17 functions a safety locking means for holding slide 21 against spring 23, which is functioning as a biasing means. Slide 21 serves as a barrier against the explosive force of primer 19, and thus renders the device safe.

Figure 2:
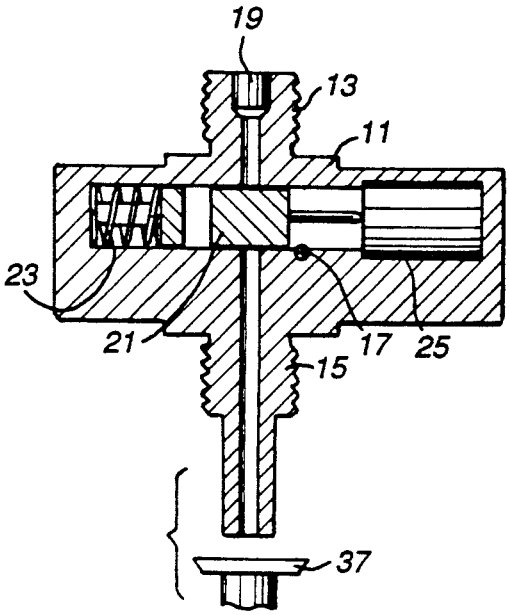
FIG. 2 is a sectional view taken along line 2,2 of FIG. 1.

As seen in FIG. 2, slide 21 is interposed in the straight line path for the primer 19 to a blasting cap 37. Slide 21 is moveable along its own path in body 11, as it is urged by spring 23 to move toward the time delay means 25.

In a preferred embodiment, time delay means 25 is a liquid annular orifice dashpot of known design, in which any desired time interval may be obtained. Preferable is at least two minutes for a time delay, and most preferred is about two to about six minutes. This range should be stable over the entire probable temperature range, from below 0° F. to about 100° F. or more. The time delay can be chosen for any particular application as needed.

In operation, the embodiment shown in FIGS. 1 and 2 will become armed after a safe period of time has elapsed to allow the operator to obtain a place of relative safety. When the safety pin 17 is pulled, spring 23 urges slide 21 against timing device 25. After the predetermined time has elapsed, the slide 21 will move in-line, allowing primer 19 to reach blasting cap 37 after firing the device by whatever means is functional for the overall system.

Figure 3:
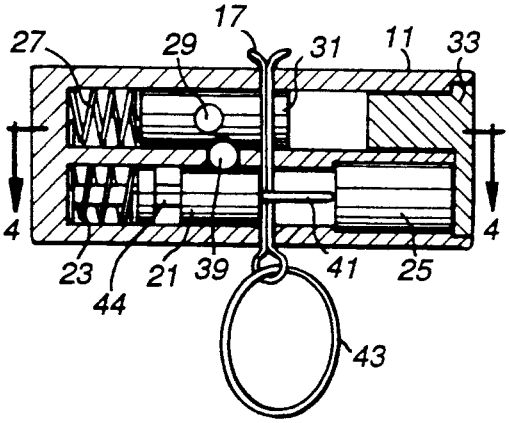
FIG. 3 is a sectional, plan view of a preferred embodiment of the present invention.
Figure 4:
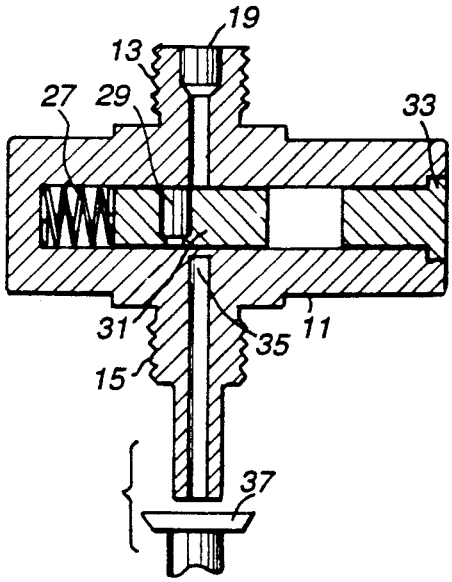
FIG. 4 is a sectional view taken along line 4,4 of FIG. 3.

Turning now to the embodiment shown in FIGS. 3 and 4, a time coupling of the present invention is shown with provisions for augmented output of the primer 19. A second spring 27 is shown acting against a second slide 31. Slide 31 blocks the line between primer 19 and blasting cap 37 in the safe position shown in FIG. 3. A blasting cap lead 29 is held by slide 31 in an out-of-line position, thereby keeping the device is a safe, non-operational condition.

Once again first slide 21 is acted on by first spring 23 to urge slide 21 into timing element 25 as described above. Thus when ring 43 on safety pin 17 is pulled and the pin 17 is removed, spring 23 urges slide 21 against timer 25. Plunger 41 may be used to activate timer 25. Again, a liquid annular orifice dashpot of known design, in which any desired time interval may be obtained, is preferred. After the appropriate time has elapsed, timer 25 allows slide 21 to move in-line, thereby releasing detent ball 39. Detent ball 39 has been holding slide 31 in position to prevent blasting cap lead 29 to line up in the straight line path from primer 19 to blasting cap 37. Once detent ball 39 moves out of contact with slide 31, that slide 31 moves in-line so that blasting cap lead 29 is in-line with primer 19 and blasting cap 37. Thus, an augmented output is achieved.

The present invention is admirably suited for adaption to existing demolition firing devices and the like because the body 11 of the device is identical in outer shape and size to the currently used base coupling unit. No current interfaces are affected and the only change to tactical application is removal of an additional safety pin in the time coupling of the present invention.

While particular embodiments of the present invention have been illustrated and described herein, it is not intended that these illustrations and descriptions limit the invention. Changes and modifications may be made herein without departing from the scope and spirit of the following claims.

I claim:

1. A coupling device for use with a primer and blasting cap, comprising:

a body portion defining a straight line path from said primer to said blasting cap;

a moveable slide means positioned in said body to block said path, said slide means being moveable to clear said path;

biasing means urging said slide means to clear said path;

safety locking means holding said slide against said biasing means, said locking means being removeable upon demand; and time delay means for delaying movement of said slide means by said biasing means to clear said path after removal of said safety locking means.

2. The device of claim 1, wherein said safety locking means is a safety pin.

3. The device of claim 2, wherein said time delay means is a liquid annular orifice dashpot with a time delay of at least 2 minutes.

4. The device of claim 3, wherein said time delay is between 2 and 6 minutes.

5. The device of claim 1, wherein said slide means includes a first slide positioned in said path, said first slide having a blasting cap lead aligned to be in said path when said slide means clears said path, said first slide having second biasing means urging said first slide to clear said path;

said slide means also including a second slide positioned in a first position by said safety lock means spaced from said time delay means, said biasing means urging said second slide toward said time delay means;

said slide means also including detent means preventing movement of said first slide until movement of said second slide is permitted by said time delay means.

6. The of claim 5, wherein said time delay means is a liquid annular orifice dashpot with a time delay of at least 2 minutes.

7. A coupling device for use with a primer and blasting cap comprising:

a body portion defining a straight line path from said primer to said blasting cap;

a moveable slide means positioned in said body to block said path, said slide means being moveable to clear said path;

biasing means urging said slide means to clear said path;

safety locking means holding said slide against said biasing means, said locking means being removeable upon demand; and time delay means for delaying movement of said slide means by said biasing means to clear said path after removal of said safety locking means;

said slide means including a first slide positioned in said path, said first slide having a blasting cap lead aligned to be in said path when said slide means clears said path, said first slide having second biasing means urging said first slide to clear said path;

said slide means also including a second slide positioned in a first position by said safety lock means spaced from said time delay means, said biasing means urging said second slide toward said time delay means;

said slide means also including detent means preventing movement of said first slide until movement of said second slide is permitted by said time delay means.

8. The device of claim 7, wherein said safety locking means is a safety pin.

9. The device of claim 7, wherein said time delay means is a liquid annular orifice dashpot with a time delay of at least 2 minutes.

10. The device of claim 3, wherein said time delay is between 2 and 6 minutes.

* * * * *